(12) United States Patent
Schumacher

(10) Patent No.: US 7,131,655 B2
(45) Date of Patent: Nov. 7, 2006

(54) RUNNING BOARD, MOTOR VEHICLE INCLUDING A RUNNING BOARD, AND METHODS FOR MANUFACTURING AND USING A RUNNING BOARD

(75) Inventor: Chris Schumacher, Frederick, CO (US)

(73) Assignee: Lund International, Inc., Anoka, MN (US)

( * ) Notice: Subject to any disclaimer, the term of this patent is extended or adjusted under 35 U.S.C. 154(b) by 0 days.

(21) Appl. No.: 10/115,588

(22) Filed: Apr. 2, 2002

(65) Prior Publication Data

US 2003/0184039 A1    Oct. 2, 2003

(51) Int. Cl.
    *B60R 3/00* (2006.01)
(52) U.S. Cl. ...................... 280/163; 296/151
(58) Field of Classification Search .............. 280/163, 280/164.1–164.2, 166, 169; 182/90–92, 182/127; 296/151
    See application file for complete search history.

(56) References Cited

U.S. PATENT DOCUMENTS

| | | | | |
|---|---|---|---|---|
| 890,963 A | * | 6/1908 | Coffin | 280/163 |
| 1,789,875 A | | 1/1931 | Loudenslager | |
| 1,861,430 A | * | 5/1932 | Bronson | 280/163 |
| 1,998,366 A | | 4/1935 | Geyer | |
| 2,021,522 A | | 11/1935 | Schacht | |
| 2,064,134 A | | 2/1936 | Weiland | |
| 2,044,407 A | | 6/1936 | Smith | |
| 2,122,240 A | * | 6/1938 | Smith | 280/169 |
| 2,132,471 A | | 10/1938 | Hoffman | |
| 2,537,707 A | * | 1/1951 | Russ et al. | 280/848 |
| 3,488,082 A | | 1/1970 | Wallace | |
| 4,017,093 A | * | 4/1977 | Stecker, Sr. | 280/163 |
| 4,544,991 A | * | 10/1985 | Gorsuch | 362/495 |
| 4,557,494 A | * | 12/1985 | Elwell | 362/495 |
| 4,749,191 A | | 6/1988 | Gipson et al. | |
| 4,930,797 A | * | 6/1990 | Parrill | 280/166 |
| 4,935,638 A | | 6/1990 | Straka | |
| 4,985,810 A | | 1/1991 | Ramsey | |
| D330,536 S | | 10/1992 | Holloway et al. | |
| 5,265,896 A | * | 11/1993 | Kravitz | 280/163 |
| 5,286,049 A | * | 2/1994 | Khan | 280/163 |
| 5,349,795 A | * | 9/1994 | French et al. | 52/183 |

(Continued)

FOREIGN PATENT DOCUMENTS

CA    2349517    *    6/2001

OTHER PUBLICATIONS

"Lund SuperStep Installation Instructions", 4 Pages, © Oct. 1994, date and author unknown.

(Continued)

*Primary Examiner*—Christopher P. Ellis
*Assistant Examiner*—Vaughn Coolman
(74) *Attorney, Agent, or Firm*—Merchant & Gould, P.C.

(57) ABSTRACT

A running board is provided by the invention. The running board includes a deck and a plurality of attachment members. The deck and the plurality of attachment members are formed from a continuous polymer composition. The deck has a stepping surface and a support structure for supporting the stepping surface. The plurality of attachment members extend from the support structure and each attachment member has at least one opening for receipt of a fastener. The plurality of attachment members are provided for attachment to at least one of a motor vehicle frame and a motor vehicle rocker panel. A motor vehicle and methods for manufacturing and installing a running board are provided.

20 Claims, 7 Drawing Sheets

U.S. PATENT DOCUMENTS

| | | | |
|---|---|---|---|
| 5,382,035 A | | 1/1995 | Waddington et al. |
| 5,713,589 A | * | 2/1998 | Delgado et al. ............ 280/163 |
| 5,738,180 A | | 4/1998 | Hofmann et al. |
| 5,769,439 A | * | 6/1998 | Thompson ................. 280/163 |
| 5,961,138 A | * | 10/1999 | Roark et al. ................ 280/291 |
| 6,050,579 A | * | 4/2000 | Selland et al. .............. 280/163 |
| 6,158,756 A | * | 12/2000 | Hansen ....................... 280/166 |
| 6,173,979 B1 | * | 1/2001 | Bernard ...................... 280/163 |
| 6,270,106 B1 | * | 8/2001 | Maki et al. ................. 280/291 |
| 6,412,799 B1 | * | 7/2002 | Schrempf ................... 280/163 |
| 6,513,821 B1 | * | 2/2003 | Heil ............................ 280/169 |
| 6,702,329 B1 | * | 3/2004 | Nishio ....................... 280/849 |
| 6,997,469 B1 | * | 2/2006 | Lanoue et al. ............. 280/163 |
| 2003/0085544 A1 | * | 5/2003 | Heil et al. .................. 280/163 |
| 2004/0239068 A1 | * | 12/2004 | Chuba et al. ............... 280/163 |

OTHER PUBLICATIONS

Delta III "Running Board", Brochure, 1 Page, date and author unknown.

* cited by examiner

RUNNING BOARD, MOTOR VEHICLE INCLUDING A RUNNING BOARD, AND METHODS FOR MANUFACTURING AND USING A RUNNING BOARD

FIELD OF THE INVENTION

The invention relates to a running board for a motor vehicle, to a motor vehicle including a running board, and to methods for manufacturing and installing a running board for motor vehicles.

BACKGROUND OF THE INVENTION

Many types of vehicles, including sports utility vehicles, pick up trucks, and vans, are raised off the ground farther than normal passenger automobiles. The increased height of the floor of the passenger cab from the ground makes it difficult to enter and exit these vehicles. Running boards are available to assist the driver and passengers in entering and exiting these vehicles. There exists numerous references describing various running board designs. For example, see U.S. Pat. No. 5,713,589 to Delgado et al.; U.S. Pat. No. 5,382,035 to Waddington et al.; U.S. Pat. No. 4,544,991 to Gorsuch; U.S. Pat. No. 4,557,949 to Elwell, and U.S. Pat. No. 5,265,896 to Kravitz.

SUMMARY OF THE INVENTION

A running board is provided according to the invention. The running board can be referred to as a "bracketless" running board. This means that a bracket assembly is not required for attaching the running board to a motor vehicle. Rather, the running board attaches directly to a motor vehicle with the use of a plurality of fasteners such as nut and bolt fasteners, screw fasteners, etc.

The running board includes a deck and a plurality of attachment members. The deck has a stepping surface and a support structure for supporting the stepping surface. The plurality of attachment members extend from the support structure and each attachment member has at least one opening for receipt of a fastener for attachment to the vehicle. The plurality of attachment members are provided for attachment to at least one of a motor vehicle frame and motor vehicle rocker panel. The deck and the plurality of attachment members can be formed from a continuous polymer composition. The continuous polymer composition can include rubber, synthetic rubber, acrylonitrile-butadiene-styrene polymer, polycarbonate polymer, and blends thereof.

A motor vehicle is provided according to the invention. The motor vehicle includes a frame, a rocker panel, and a running board attached to at least one of the frame and the rocker panel. The motor vehicle can have a running board provided beneath the driver's side door and a running board provided beneath the passenger's side door.

A method for manufacturing a running board is provided according to the invention. The method includes a step of injection molding a polymer composition to provide the running board having a deck and a plurality of attachment members.

A method for installing a running board on a motor vehicle is provided according to the invention. The method includes steps of providing the running board in position against the motor vehicle below the motor vehicle door, and fastening the plurality of attachment members of the running board to the motor vehicle using a plurality of fasteners.

DETAILED DESCRIPTION OF THE PREFERRED EMBODIMENT

Figure 1:
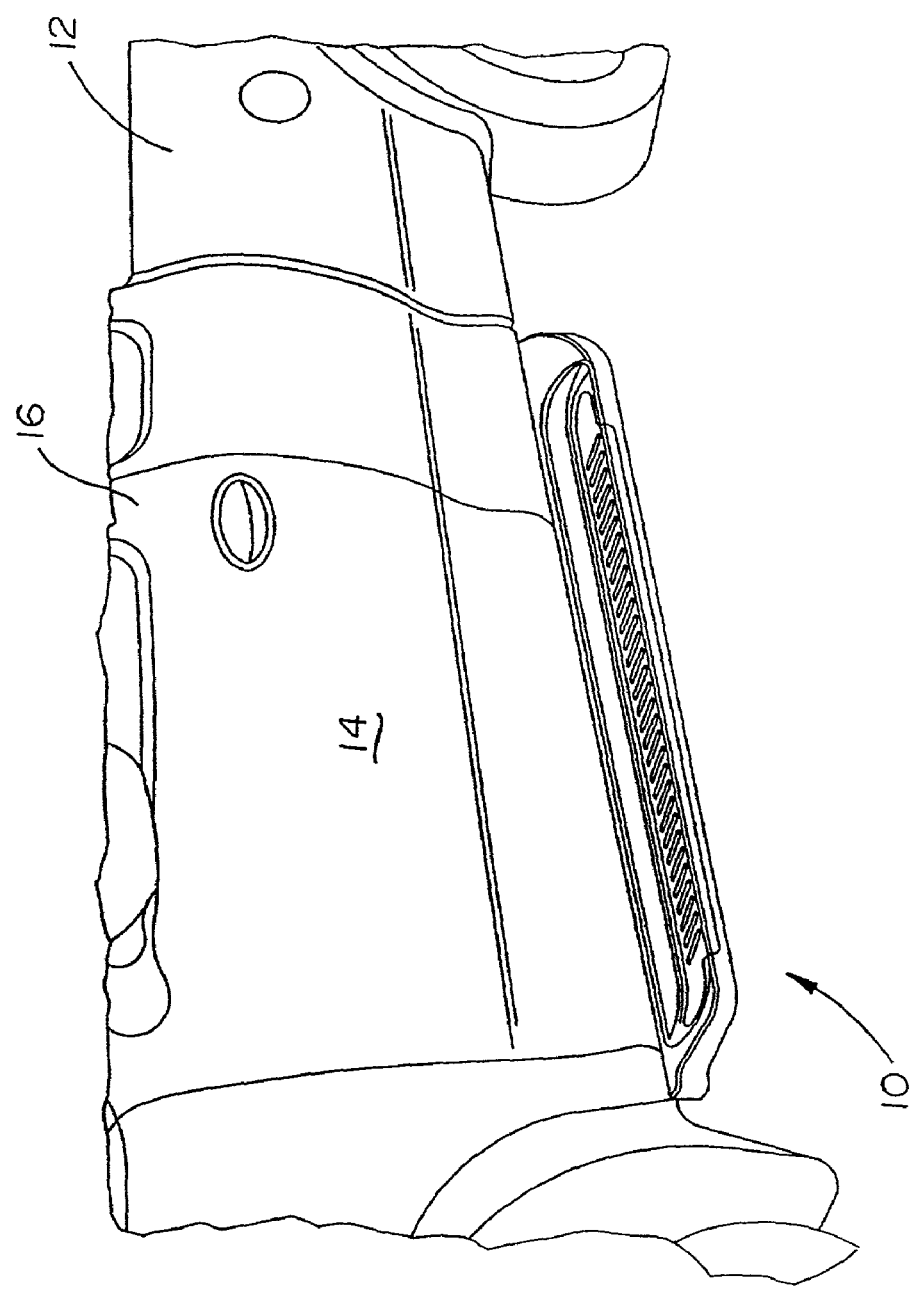
FIG. 1 is a perspective view of a running board according to the principles of the present invention attached to a motor vehicle.
Figure 5:
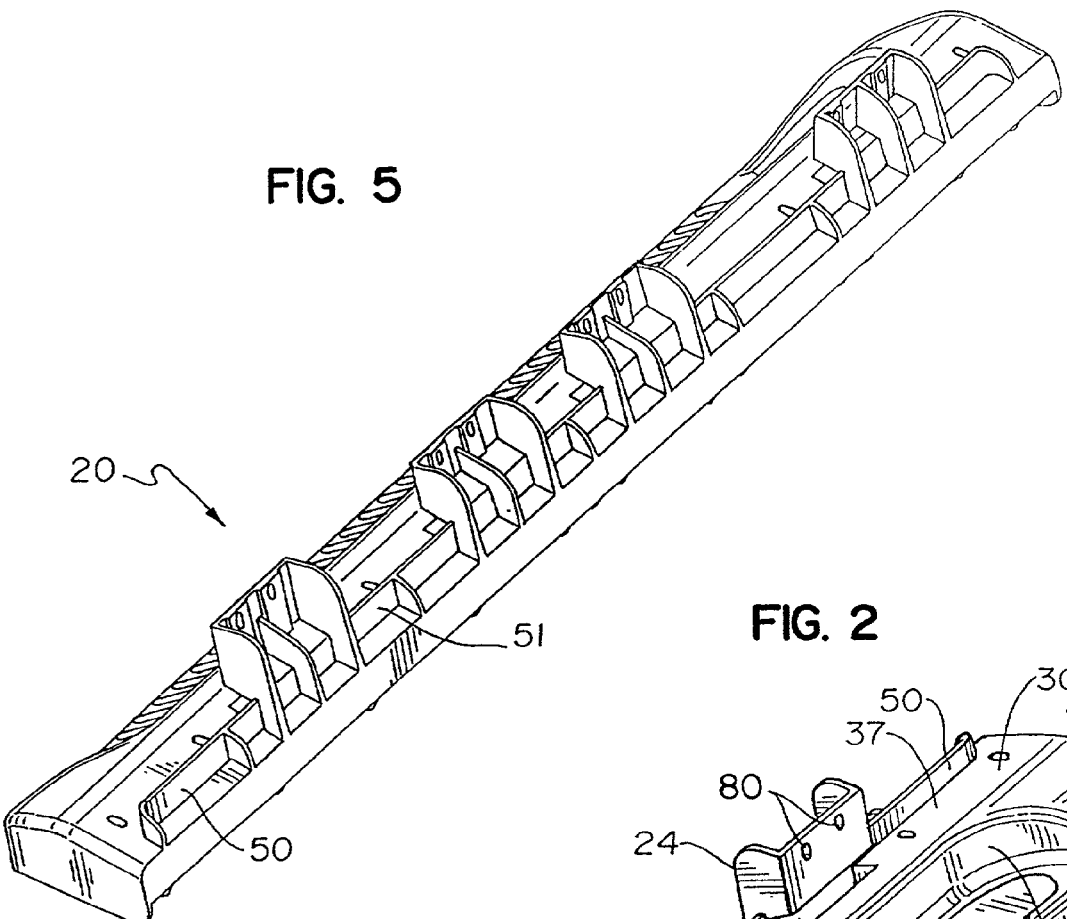
FIG. 5 is a perspective view of the top and rear sides of the running board of FIG. 2.
Figure 2:
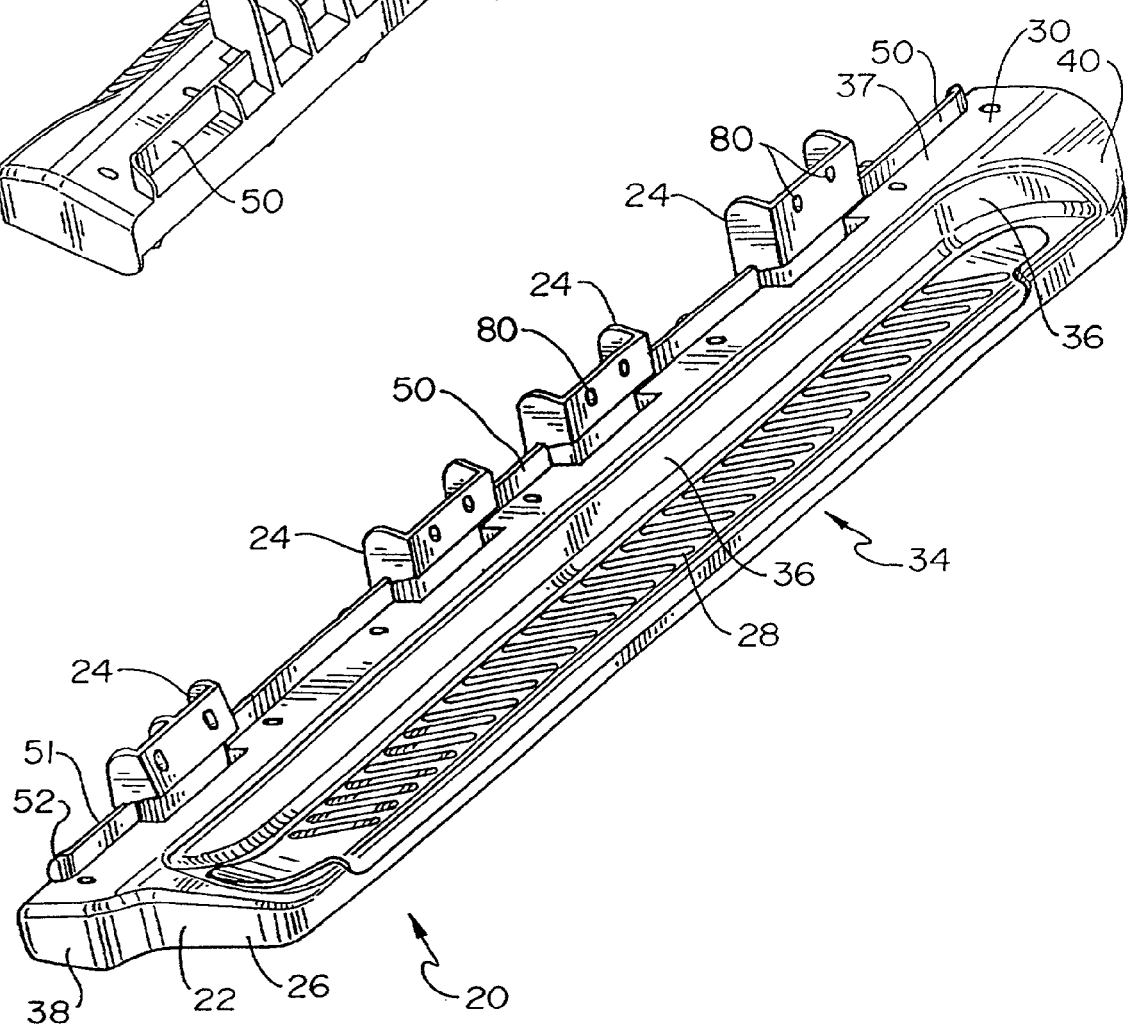
FIG. 2 is a perspective front view of a running board according to the principles of the present invention.
Figure 3:
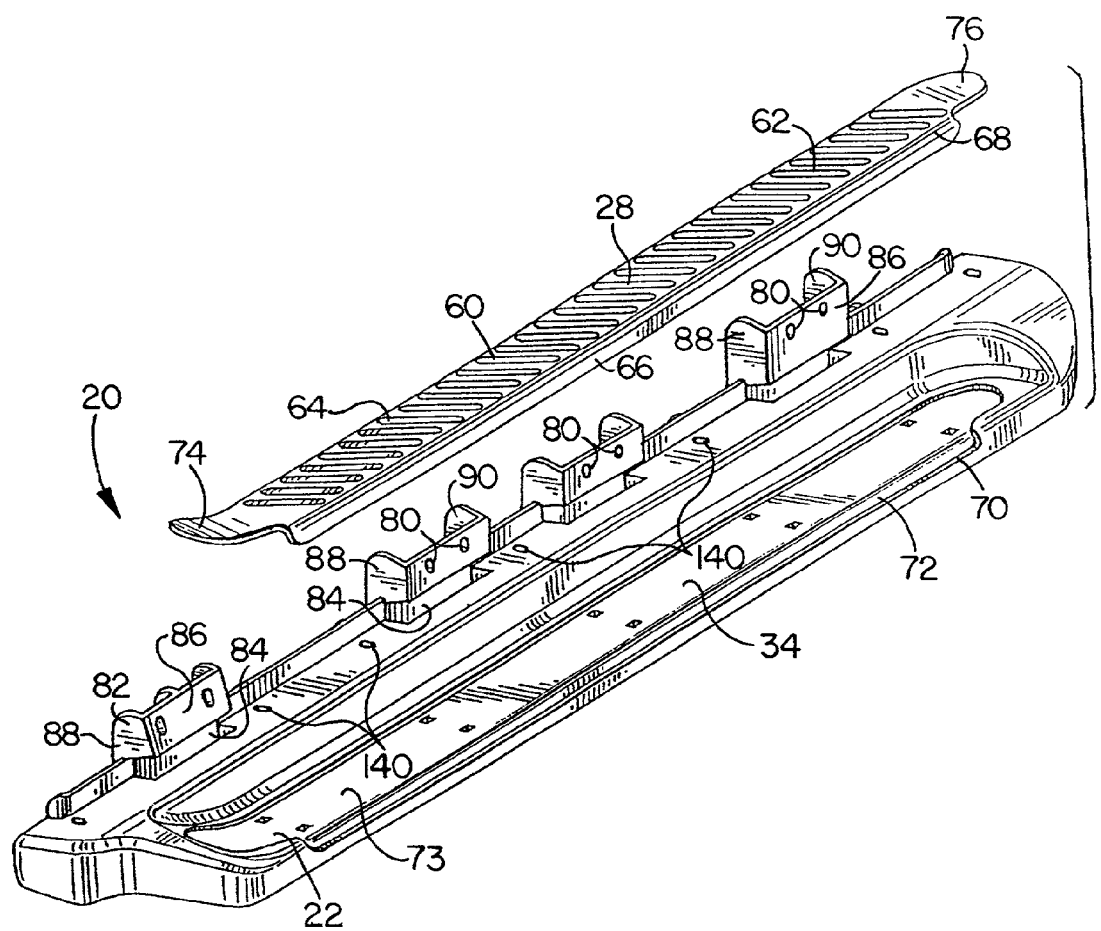
FIG. 3 is an exploded perspective view of the running board of FIG. 2.

Referring to FIG. 1, a running board according to the invention is shown at reference numeral 10. The running board 10 is shown attached to a motor vehicle 12. The running board 10 is provided beneath the vehicle door 14 so that it functions as a step for someone entering or exiting the vehicle. The motor vehicle 12 is a pick up truck 16. The running board 10 can be provided on any type of motor vehicle where a step is desired to assist entering or exiting the vehicle. Various types of vehicles that can be provided with a running board include pickup trucks, sports utility vehicles, vans, trucks, and the like. The running board according to the invention can be provided beneath a single door as shown in FIG. 1 or it can be provided so that it extends the front and rear doors of a motor vehicle.

The running board 10 can be referred to as a "bracketless" running board because of the absence of a separate bracket assembly for attaching the running board to the motor vehicle and for supporting the running board. Instead, the running board 10 is directly attached to the motor vehicle using fasteners. A separate bracket structure that attaches to the motor vehicle and supports the running board can be avoided by using the running board according to the present invention. In particular, a separate metal bracket structure can be avoided by using the running board according to the present invention.

Now referring to FIGS. 2–6, a running board according to the invention is shown at reference numeral 20. The running board 20 includes a deck 22 and a plurality of attachment members 24. The deck 22 includes a support structure 26 and a stepping surface 28. In general, the support structure 26 is provided for supporting the weight of a person stepping on the stepping surface 28 when entering or leaving a motor vehicle. The plurality of attachment members 24 are provided extending from the deck 22. As shown, the plurality of attachment members 24 extend from the support structure 26 of the deck 22.

Figure 4:
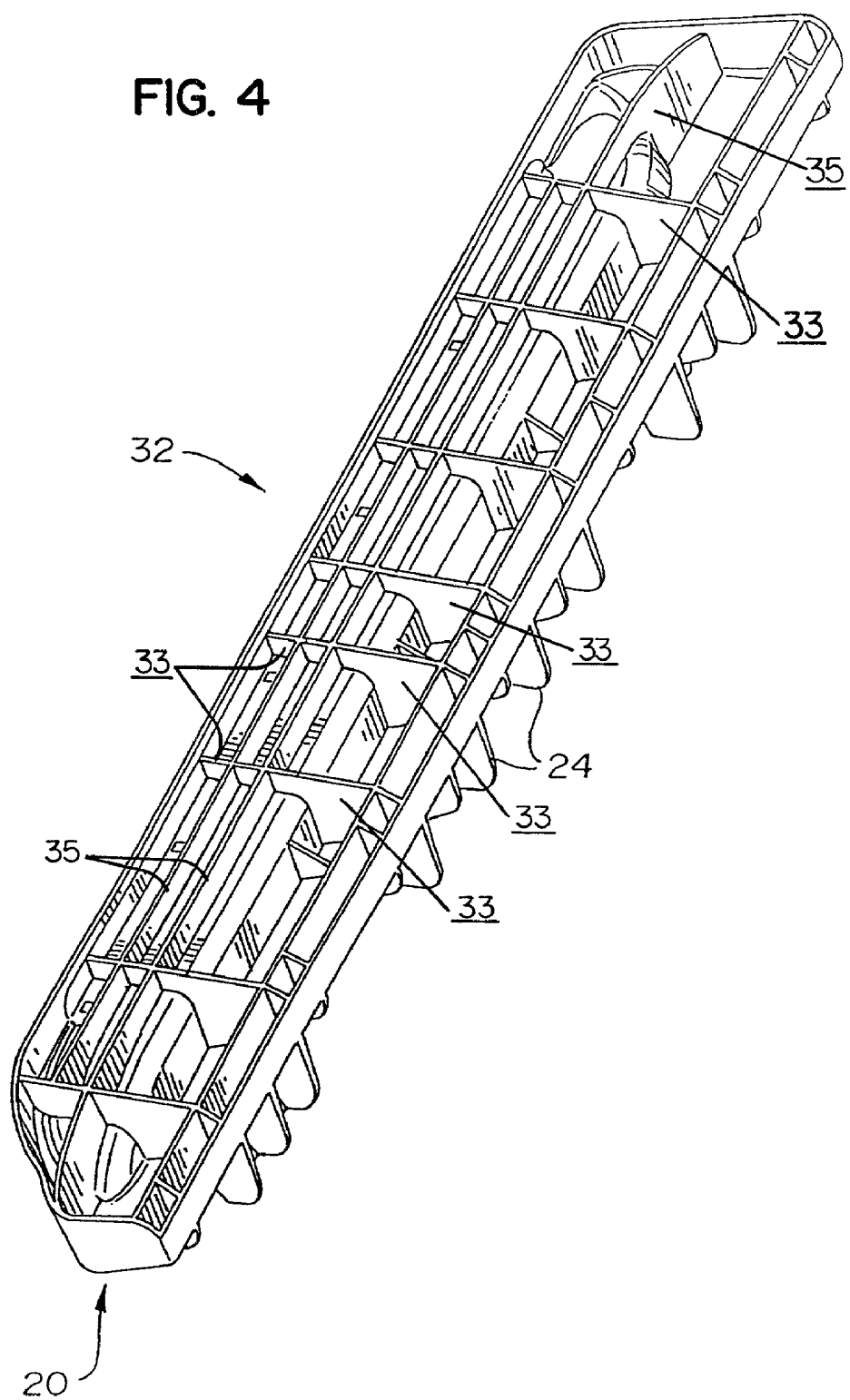
FIG. 4 is a perspective bottom view of the running board of FIG. 2.
Figure 6:
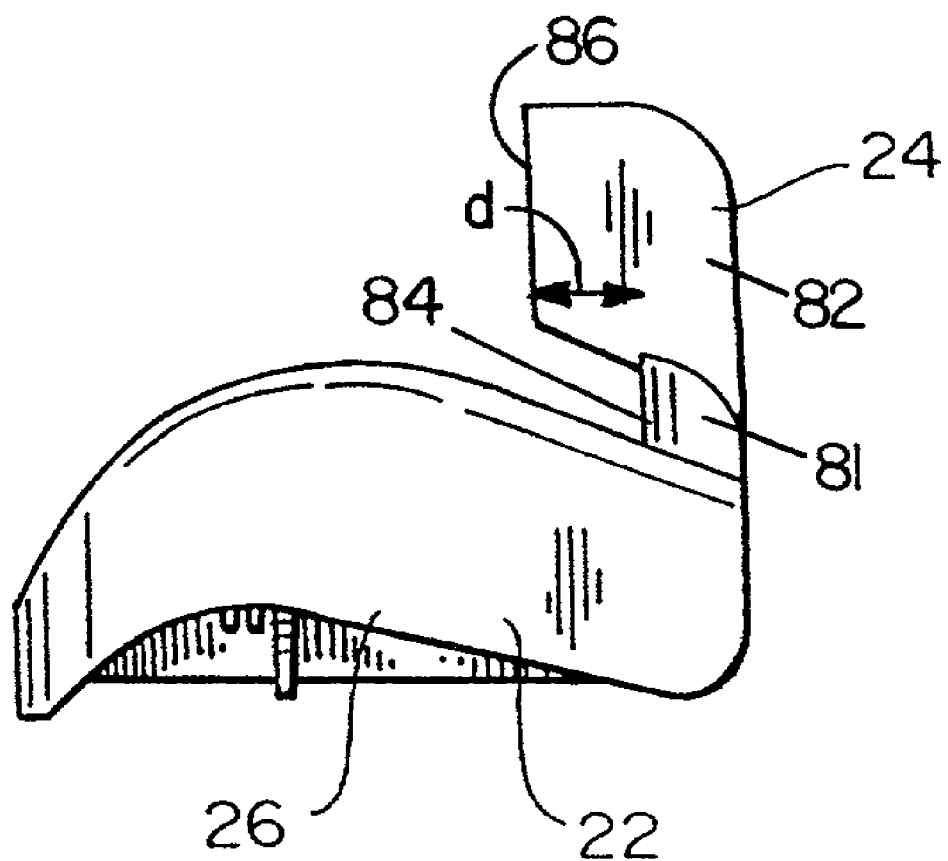
FIG. 6 is a side view of the running board of FIG. 2.

The support structure 26 is provided with an exterior finished surface 30 that is the portion of the running board 20 that is generally seen when the running board 20 is mounted to a motor vehicle. The support structure 26 includes a lattice structure 32 for providing structural support while minimizing the weight of the support structure and/or the amount of material used to provide sufficient support. As shown in FIG. 4, the lattice structure 32 includes a plurality of walls 33 and 35 that intersect each other and provide reinforcement for the stepping surface 28 so that the running board 20 will support the weight of a person. The walls 35 and 33 can be constructed so that walls 35 extend along the length of the running board and the walls 33 extend along the width of the running board.

A stepping area 34 is provided that is recessed within the deck 22. That is, the walls 36 extend from the deck top surface 37 to the stepping surface 28. The deck 22 includes a front end 38 and a rear end 40. In general, the running board 20 extends from the front end 38 to the rear end 40. The stepping area 34 is provided between the front end 38 and the rear end 40.

The deck 22 includes a skirt 50 extending along a length of the running board 20. The skirt 50 can be provided as a lip 51 that extends from the deck top surface 37. In general, the skirt 50 is provided to minimize the potential of having a gap between the motor vehicle and the running board 20. The skirt 50 provides a finished surface for the running board 20 against the motor vehicle when the door of the motor vehicle is opened. The skirt 50 can be provided so that it does not extend the entire length of the running board 20. As shown, the skirt 50 terminates at a front skirt end 52 and at a rear skirt end 54. If desired, the skirt 50 can be provided the entire length of the running board 20.

The stepping surface 28 can be provided as an insert 60 that fits within the stepping area 34. The insert 60 can have a top surface 62 having a tread pattern 64 that helps provide traction when stepping thereon. The insert 60 can have a front lip 66 that extends from a front end 68 of the insert 60 and wraps downward. The lip 66 can be provided so that it extends over the forward edge 70 of the deck 22. The forward edge 70 can be provided having a recess 72 that allows the lip 66 to fit therein. The insert 60 can additionally have a forward end 74 and a rearward end 76 that provide a contoured shape for the stepping area 34. The forward end 74 and the rearward end 76 can be provided so that they curve upward so that the ends of the insert 60 flow into the walls 36. The stepping area 34 can be provided having a recessed stepping area 73 that recesses into the deck 22. This allows the insert 60 to fit in place within the recess 73. In general, it is expected that the insert 60 can snap into place within the stepping area 34. Alternatively, the insert 60 can be held in place in the stepping area 34 by a fastener. Exemplary fasteners that could be used include adhesives, tape, rivets, screws, and the like.

The plurality of attachment members 24 extend from the deck 22 and are constructed so that they attach to the frame and/or the rocker panel of a motor vehicle by a fastener such as a bolt and nut or screw type fastener. The plurality of attachment members include openings 80 that provide for the receipt of a fastener for attaching to the motor vehicle.

The plurality of attachment members 24 include an arm 81 and a fastener area 82. The arm 81 extends from the deck 22 to the fastener area 82, and can include a finished exterior surface 84 consistent with the skirt 50. The fastener area 82 can be provided so that it extends away from the arm 81 and toward the forward edge 70 of the deck 22. This extension can be characterized by the distance d shown in FIG. 6. The distance d is provided so that the running board 20 fits at the proper position underneath the vehicle door and so that the fastening member 86 can be provided proximate the frame and/or the rocker panel of the motor vehicle. Although spacers or shims can be provided between the fastening member 86 and the frame and/or rocker panel of the motor vehicle, it can be advantageous to construct the running board so that the fastening member 86 is adjacent to the frame and/or the rocker panel. Left side supports 88 and right side supports 90 can be provided to help stabilize and support the fastening member 86.

Figure 7:
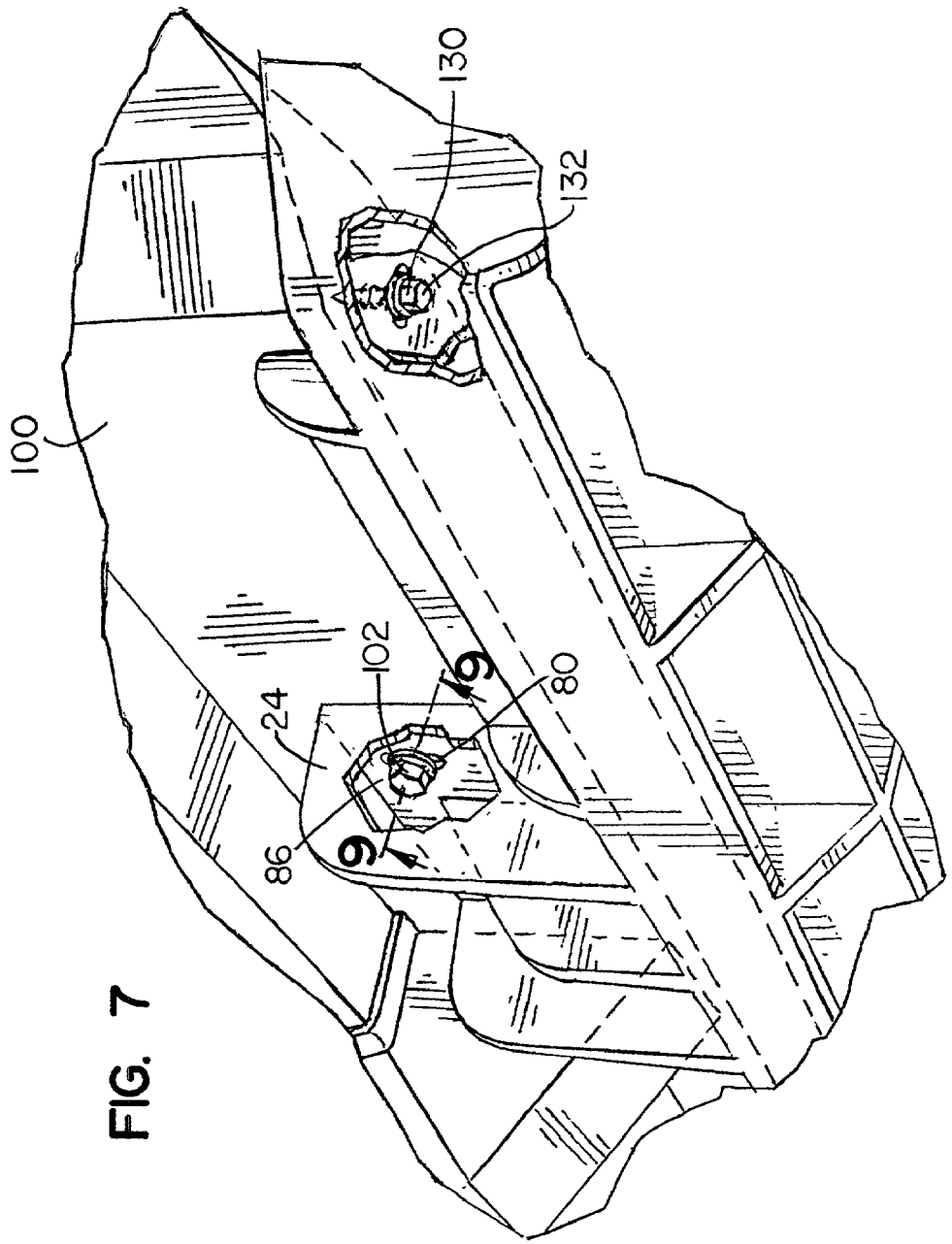
FIG. 7 is a perspective, cutaway, view showing the running board of FIG. 2 shown attached to a motor vehicle.
Figure 8:
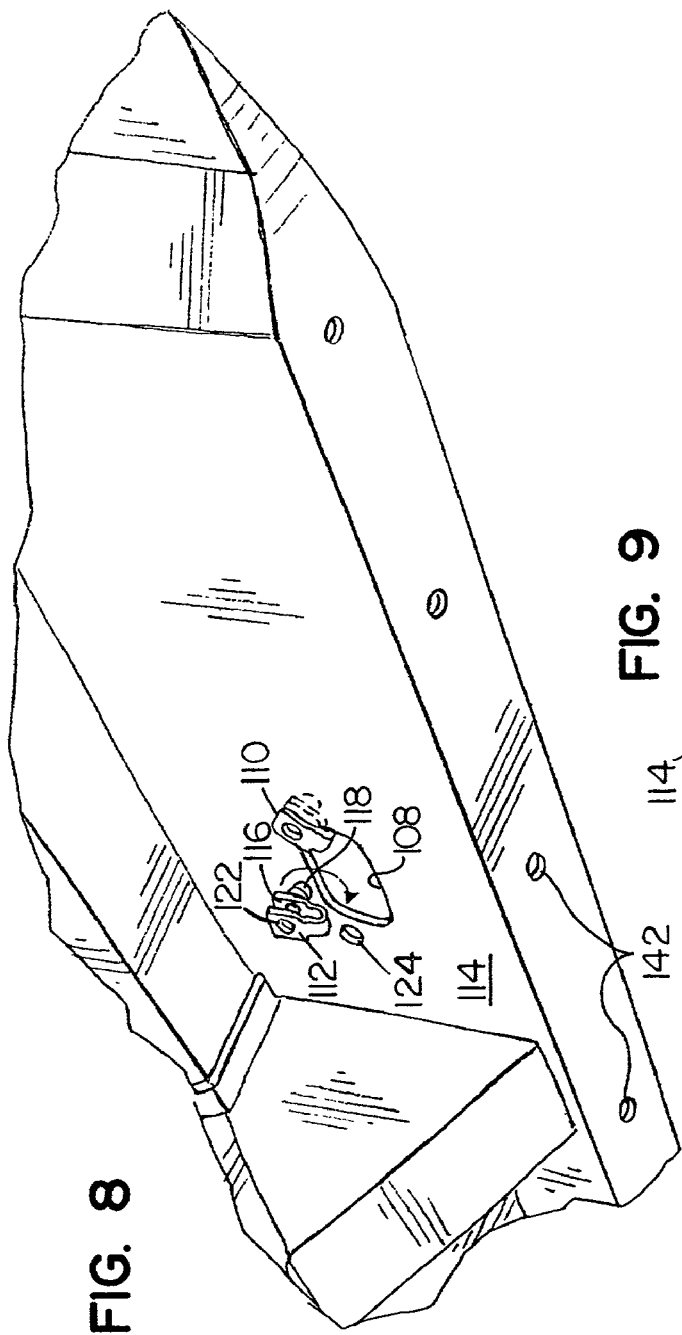
FIG. 8 is a perspective view showing a step in a process for attaching the running board of FIG. 2 to the motor vehicle.
Figure 9:
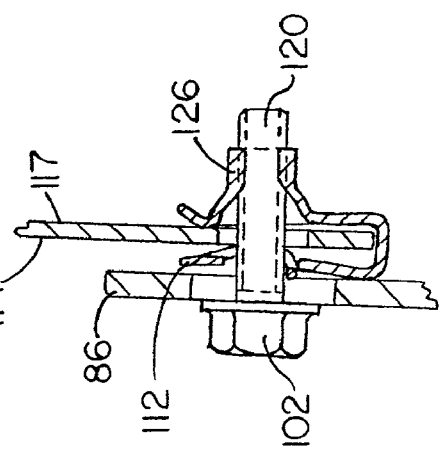
FIG. 9 is a sectional view taken along lines 9—9 of FIG. 7 showing the attachment of the running board to the rocker panel of the motor vehicle.

Now referring to FIGS. 7–9, attachment of the running board 20 to a rocker panel 100 of a motor vehicle is shown. As shown in FIG. 7, the fastening member 86 of the attachment member 24 is provided adjacent to the rocker panel 100. A bolt 102 is provided for holding the fastening member 86 against the rocker panel 100. The bolt 102 extends through the opening 80 provided in the fastening member 86. The bolt 102 can be held in place by a threaded fastening nut.

As shown in FIGS. 8 and 9, the rocker panel 100 can have an opening 108 that allows one to insert a clip nut 110 therein so that the clip nut 110 has a first side 112 that is provided against the exterior 114 of the rocker panel 100, and a second side 116 that is provided against the inside surface 117 of the rocker panel 100. The second side 116 of the clip nut 110 can be threaded 118 so that it receives the threaded end 120 of the bolt 102. The clip nut 110 can be provided so that its opening 122 corresponds to the opening 124 provided in the rocker panel 100. The fastening member 86 is then placed against the first side 112 of the clip nut 110, and the bolt 102 is inserted through the opening 80 and the opening 124 and can be threaded through the threads 126. Tightening the bolt 102 holds the fastening member 86 in place relative to the rocker panel 100.

As additionally shown in FIGS. 7 and 8, the deck 22 of the running board 20 can be fastened to the motor vehicle via the fasteners 130. The fasteners 130 can be screw fasteners 132. The fasteners 130 can extend through the openings 140 provided in the deck top surface 37 and can engage the openings 142 provided in the rocker panel 100.

The finished surface 30 of the running board can be painted to match the finish of the motor vehicle. The running board 20 is preferably prepared from a polymer composition. Exemplary polymer compositions include acrylonitrile/butadiene/styrene copolymers, polycarbonates, natural rubbers, synthetic rubbers, and mixtures thereof. The polymer composition can be characterized as structural foam plastics when provided as a cellular material. Exemplary structural foam plastics include cellular polycarbonate and cellular acrylonitrile butadiene styrene/polycarbonate blends.

An advantage of the invention is that a separate bracket assembly is not required for attaching the running board to a motor vehicle. That is, the running board according to the invention attaches directly to a motor vehicle without the use of a bracket assembly. In addition, the deck and the plurality of attachment members can be formed from the same polymer composition. The deck and the plurality of attachment members can be characterized as being formed from a continuous plastic material when it is prepared from a single polymer composition. A method for forming the deck and the plurality of attachment members is by injection molding a polymer composition. It should be understood that a polymer composition can include blends of polymers and other components.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A running board comprising:
   deck having a stepping surface and a support structure for supporting the stepping surface;
   plurality of attachment members extending from the support structure, each attachment member having at least one opening for receipt of a fastener, a fastening member extending to the support structure, a left side support extending along a left side of the fastening member to the support structure for stabilizing and supporting the fastening member, and a right side support extending along a right side of the fastening member to the support structure for stabilizing and supporting the fastener member, the plurality of attachment members being provided for attachment to at least one of a motor vehicle frame or a motor vehicle rocker panel; and
   wherein the deck and the plurality of attachment members are formed from a continuous polymer composition.

2. A running board according to claim 1, wherein the continuous polymer composition comprises acrylonitrile-butadiene-styrene polymer.

3. A running board according to claim 1, wherein the continuous polymer composition comprises polytarbonate polymer.

4. A running board according to claim 1, wherein the plurality of attachment members comprise an arm extending away from a top surface of the deck, and a fastening area comprising a fastener member constructed to fit against at least one of a motor vehicle frame and a motor vehicle rocker panel and having the opening for receipt of a fastener provided therethrough.

5. A running board according to claim 1, wherein the stepping surface comprises a tread mat provided thereon.

6. A running board according to claim 1, wherein the deck and the plurality of attachment members are formed by injection molding.

7. A running board according to claim 1, wherein the running board does not include a bracket assembly, separate from the plurality of attachment members, for attaching the running board to a motor vehicle.

8. A method for manufacturing a running board, the method comprising:
   (a) injection molding a polymer composition to provide a molded polymer composition having:
      (i) deck having a stepping surface and a support structure for supporting the stepping surface;
      (ii) plurality of attachment members extending from the support structure, each attachment member having at least one opening for receipt of a fastener, a fastening member extending to the support structure, a left side support extending along a left side of the fastening member to the support structure far stabilizing and supporting to fastening member, and a right side support extending along a right side of the fastening member to the support structure for stabilizing and supporting the fastener member, the plurality of attachment members being provided for attachment to at least one of a motor vehicle frame or a motor vehicle rocker panel; and
      (iii) wherein the running board is constructed for attachment to a motor vehicle and, when attached to a motor vehicle, can support the weight of a person stepping on the running board.

9. A method for installing a running board on a motor vehicle, the method comprising steps of:
   (a) providing a running board in position against a motor vehicle below a door of the motor vehicle, wherein the running board comprises:
      (i) deck having a stepping surface and a support structure for supporting the stepping surface;
      (ii) plurality of attachment members extending from the support structure, each attachment member having at least one opening for receipt of a fastener, a fastening member extending to the support structure, a left side support extending along a left side of the fastening member to the support structure for stabilizing and supporting the fastening member, and a right side support extending along a right side of the fastening member to the support structure for stabilizing and supporting the fastener member, the plurality of attachment members being provided for attachment to at least one of a motor vehicle frame or a motor vehicle rocker panel; and
      (iii) wherein the deck and the plurality of attachment members are formed from a continuous polymer composition; and
   (b) fastening the plurality of attachment members to at least one of the motor vehicle frame and the motor vehicle rocker panel using a plurality of fasteners.

10. A method according to claim 9, further comprising a step of:
   (a) fastening the deck to the motor vehicle rocker panel using a plurality of fasteners.

11. A method according to claim 10, wherein the plurality of fasteners for fastening the deck to the motor vehicle rocker panel comprises screw fasteners.

12. A method according to claims 9, wherein the plurality of fasteners for fastening the plurality of attachment members to at least one of the motor vehicle frame and the motor vehicle rocker panel comprises a clip nut and a threaded bolt.

13. A method according to claim 9, wherein the continuous polymer composition comprises acrylonitrile-butadiene-styrene polymer.

14. A method according to claim 9, wherein the continuous polymer composition comprises polycarbonate polymer.

15. A method according to claim 9, wherein the plurality of attachment members comprise an arm extending away from a top surface of the deck, and a fastening area comprising a fastener member constructed to fit against at least one of the motor vehicle frame and the motor vehicle rocker panel and having the opening for receipt of a fastener provided therethrough.

16. A method according to claim 9, wherein the stepping surface comprises a tread mat provided thereon.

17. A method according to claim 9, wherein the deck and the plurality of attachment members are formed by injection molding.

18. A method according to claim 9, wherein the running board does not include a bracket assembly for attaching the running board to a motor vehicle.

19. A method according to claim 8, wherein the polymer composition comprises acrylonitrile-butadiene-styrene polymer.

20. A method according to claim 8, wherein the polymer composition comprises polycarbonate polymer.

* * * * *

UNITED STATES PATENT AND TRADEMARK OFFICE
CERTIFICATE OF CORRECTION

| | |
|---|---|
| PATENT NO. | : 7,131,655 B2 |
| APPLICATION NO. | : 10/115588 |
| DATED | : November 7, 2006 |
| INVENTOR(S) | : Schumacher |

It is certified that error appears in the above-identified patent and that said Letters Patent is hereby corrected as shown below:

Col. 5, line 53, claim 8: "structure far stabilizing" should read --structure for stabilizing--

Col. 5, line 54, claim 8: "supporting to fastening" should read --supporting the fastening--

Signed and Sealed this

Twenty-fourth Day of April, 2007

JON W. DUDAS
*Director of the United States Patent and Trademark Office*